W. S. HICKS.
Pencil-Cases.
No. 5,384.
Reissued April 29, 1873.
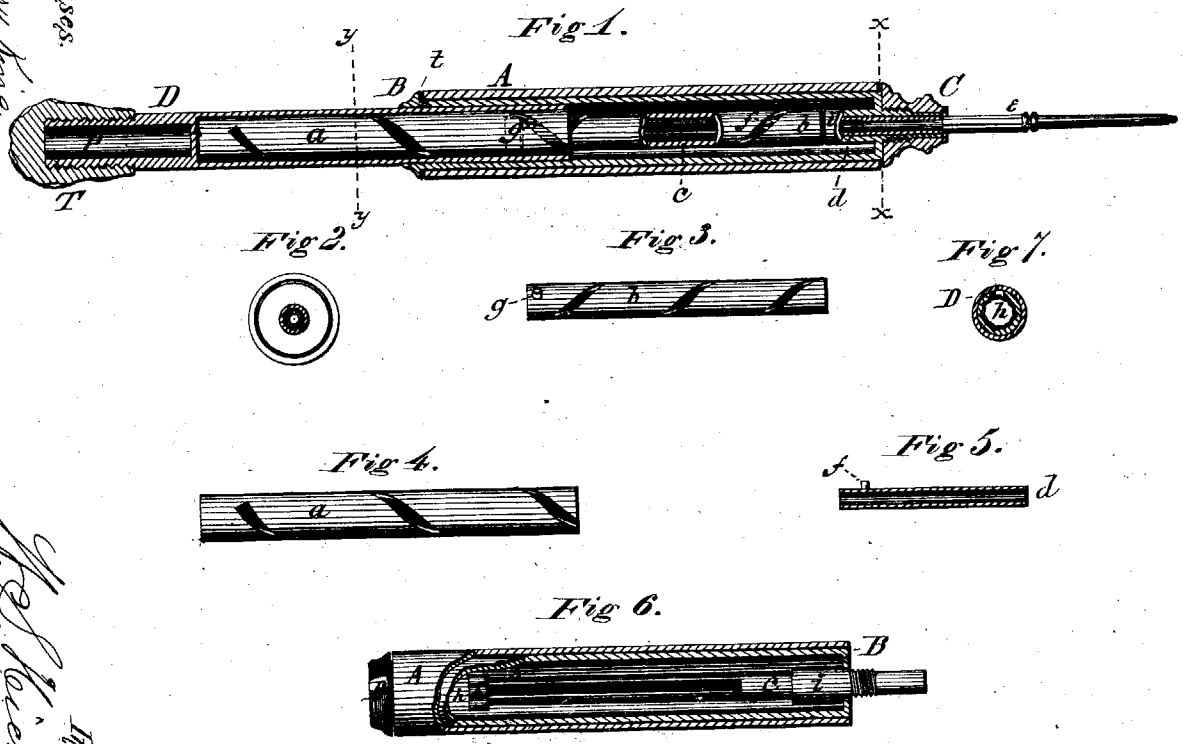
Witnesses.
Harry King.
W. E. Chaffee
Inventor:
W. S. Hicks.
by Dodges & Son
Attys.

UNITED STATES PATENT OFFICE.

WILLIAM S. HICKS, OF NEW YORK, N. Y.

IMPROVEMENT IN PENCIL-CASES.

Specification forming part of Letters Patent No. 112,917, dated March 21, 1871; reissue No. 5,384, dated April 29, 1873; application filed April 1, 1873.

*To all whom it may concern:*

Be it known that I, WILLIAM S. HICKS, of New York, in the county of New York and State of New York, have invented certain new and useful Improvements in Pencil-Cases; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use my invention, I will proceed to describe it.

My invention relates to that class of pencil-cases which are intended for pocket use; and it consists in a novel construction of the case, whereby, by pulling backward on the head, the point is made to protrude, and, more especially, whereby the outer shell, which is held fast in the hand during the operation, is mounted loosely upon the body of the case, and in securing said loose shell by a screw, whereby it can be removed or replaced at will, as hereinafter more fully explained.

Figure 1 is a longitudinal section of the pencil complete; Figs. 2 and 7, transverse sections on the lines *y y* and *x x;* and Figs. 3, 4, and 5, portions shown detached; Fig. 6, a side view of certain parts united, with portions broken away in order to represent the interior more clearly.

To construct my improved pencil-case, I take an ordinary screw-point, *e*, and secure it to a small tube, *d*, shown in section in Fig. 5. This tube *d* I insert within another tube, *c*, which has a straight slot running longitudinally nearly its whole length, as shown in Fig. 6; and then over the tube *c* I place another tube, *b*, which has a spiral slot cut in it, as shown in Figs. 1 and 3, in the latter of which it is shown detached, and also as having projecting from it laterally, near one end, a pin, *g*, which is intended to engage in a spiral slot of still another tube, *a*, which is slipped on over the tube *b*, as shown in Fig. 1. As represented, both in Figs. 1 and 4, the slot in tube *a* runs in the reverse direction from that of tube *b*. The tube *b* is secured upon tube *c* by a shoulder, *i*, at its lower end, and by a ring, *h*, which is soldered to *c* at its upper end, so that, while the tube *b* is held from sliding endwise, it is free to turn on tube *c;* and as it turns thereon its spiral slot forces the pin *f*, and thereby the inner tube *d* along the pin *f* traveling in the straight slot of tube *c*, which prevents it from turning around with tube *b*, and thus causes the point *e* to protrude, as shown in Fig. 1. Over the slotted tube *a* I secure rigidly an ornamental shell or cover, D, in the upper end of which is formed a chamber, P, closed by an ornamental head, T, for containing a supply of lead points, as is usual in this class of pencil-cases. To the shoulder *i* of the tube *c* I secure rigidly a tube, B, as represented in Figs. 1 and 6, this tube B forming the body or main shell of the case. It is made of such a diameter that when thus secured to the shoulder *i* there is left sufficient space between it and the exterior of tube *b* to permit the tube *a* and its shell D to slide in between them, as shown in Fig. 1. This tube B I form with a shoulder or flange, *t*, around its upper end, as shown in Figs. 1 and 6. I then provide an ornamental outer tube or covering, A, which I slip loosely over the shell B and secure there by the flange *t* at its upper end and a tubular point, C, which is screwed on the lower projecting end of tube *c*, as shown in Fig. 1.

It will thus be seen that this outer tube or covering A, which forms the exterior portion of the body of the case when closed, and by which the case is held when opened or closed, is free to turn loosely upon the shell B without in any manner moving or affecting any of the other parts, and that thus the shell D may be turned continuously, while the cover A is held rigidly without injury to the case in any respect. This method of securing the outer shell A is very important for several reasons.

These outer shells, when made of ivory, are necessarily very light and thin, and, if forced on tight, are apt to split or crack.

As heretofore constructed, these shells, when made of ivory, hard rubber, or any other material than metal, could not be secured by soldering on a point or shoulder without injuring the shell; and hence it has been customary to make a shoulder on the body B at one end, then slip on the outer shell A, and secure it in place by means of another short tube or sleeve, which was formed with a shoulder on one end, and which, after having some kind of cement applied, was then shoved in between the body B and the shell A at one end. This wedged the outer shell fast upon the body B, and prevented it from turning loosely thereon, and, by increasing the pressure on the outer shell, rendered the latter still more liable to crack or split. Besides this, the short sleeve was very apt to be pulled out when extending or closing the pencil, thus letting the case come apart. By using the screw-point C all this is avoided, and the shell A left free to turn loosely, while being securely fastened or held on; and, in case of repair, the outer shell A can be removed and replaced at will, or as may be necessary.

To close the pencil, it is only necessary to push in the shell D, the spiral slots in tubes *a* and *b* causing the point *e* to be drawn in, a reverse movement causing it to protrude in like manner.

By using two separate tubes with spiral slots in each, and having one slide over the other, it will be seen that the pencil can be made much shorter and more compact than those where reverse spirals are both made in one tube; or, if the tubes are of the same length, then the spirals can be made much less abrupt, and will, therefore, work with much less friction on the pins and with more ease and smoothness, both of which are very important features in this class of implements. In this way I am able to make a very short, compact, and perfect pencil-case, one that is admirably adapted for pocket use and that is not liable to be injured or get out of order.

Having thus described my invention, what I claim is—

1. An extension pencil-case having its outer shell A arranged to turn loosely on its body B, and independently of the other parts of the pencil or case, substantially as described.

2. The arrangement of the tubes *d* and *c* and the tubes *a* and *b*, the latter having reverse spiral slots, and all sliding telescopically within one another, as set forth.

3. In combination with the loose shell or casing A, the detachable or screw point C, whereby the outer shell can be applied or removed at will, and without soldering, substantially as herein set forth.

WM. S. HICKS.

Witnesses:
W. H. SEMBLER,
FORMAN WHITNEY.